United States Patent [19]
Schlumpf

[11] Patent Number: 6,123,639
[45] Date of Patent: Sep. 26, 2000

[54] APPARATUS FOR ACTUATING A SWITCHING SHAFT OPERATIVELY CONNECTED WITH A SWITCHABLE BOTTOM BRACKET BEARING GEAR

[76] Inventor: Florian Schlumpf, Dorfstrasse 10, 7324 Vilters, Switzerland

[21] Appl. No.: 09/125,639
[22] PCT Filed: Dec. 4, 1997
[86] PCT No.: PCT/CH97/00456
 § 371 Date: Aug. 21, 1998
 § 102(e) Date: Aug. 21, 1998
[87] PCT Pub. No.: WO98/29296
 PCT Pub. Date: Jul. 9, 1998

[30] Foreign Application Priority Data

Jan. 3, 1997 [CH] Switzerland ............................ 0005/97
Nov. 12, 1997 [CH] Switzerland ........................... 2605/97

[51] Int. Cl.[7] ................................................ F16H 63/30
[52] U.S. Cl. ........................................ 475/269; 192/3.52
[58] Field of Search ............................ 475/12, 294, 269; 74/810.1; 192/3.52

[56] References Cited

U.S. PATENT DOCUMENTS 678,486 7/1901 Head .......................................... 475/12
4,936,597 6/1990 Hartmann ............................ 475/277 X

FOREIGN PATENT DOCUMENTS 0 666 212 8/1995 European Pat. Off. .
38 27 819 3/1989 Germany .
658 966 10/1951 United Kingdom .
WO 92 04230 3/1992 WIPO .

*Primary Examiner*—Sherry L. Estremsky
*Attorney, Agent, or Firm*—Henry M. Feiereisen

[57] ABSTRACT

The invention relates to an apparatus for actuating a switch shaft (30) which is operatively connected with a switchable bottom bracket bearing gear (10) for a bicycle or the like, which shaft is arranged and held coaxially in a drive shaft (35) which is provided on at least one end with a torsionally rigidly arranged crank (1,2). In order to achieve a change in the rotational speed a first coupling member (23) is arranged on the drive shaft (35), which member is displaceable in the axial direction by means of the switch shaft (30), as a result of which the power transmission elements of the bottom bracket bearing gear (10) can be brought into form-locked and non-positive engagement with one another. For the movement which is oriented in the axial direction a control body (45) is provided at the other end of the drive shaft, which body is operatively connected by way of a second coupling member (40) with the switch shaft (30) and is displaceable during the swivelling movement, which is oriented about the longitudinal axis (X), in the axial direction relative to a fixed casing element (25) which is provided with at least one actuating member (27). The swivelling movement of the control body (45) is achieved, for example, by an actuating member which is operatively connected with the same and is swivellable about the longitudinal axis (X).

20 Claims, 9 Drawing Sheets

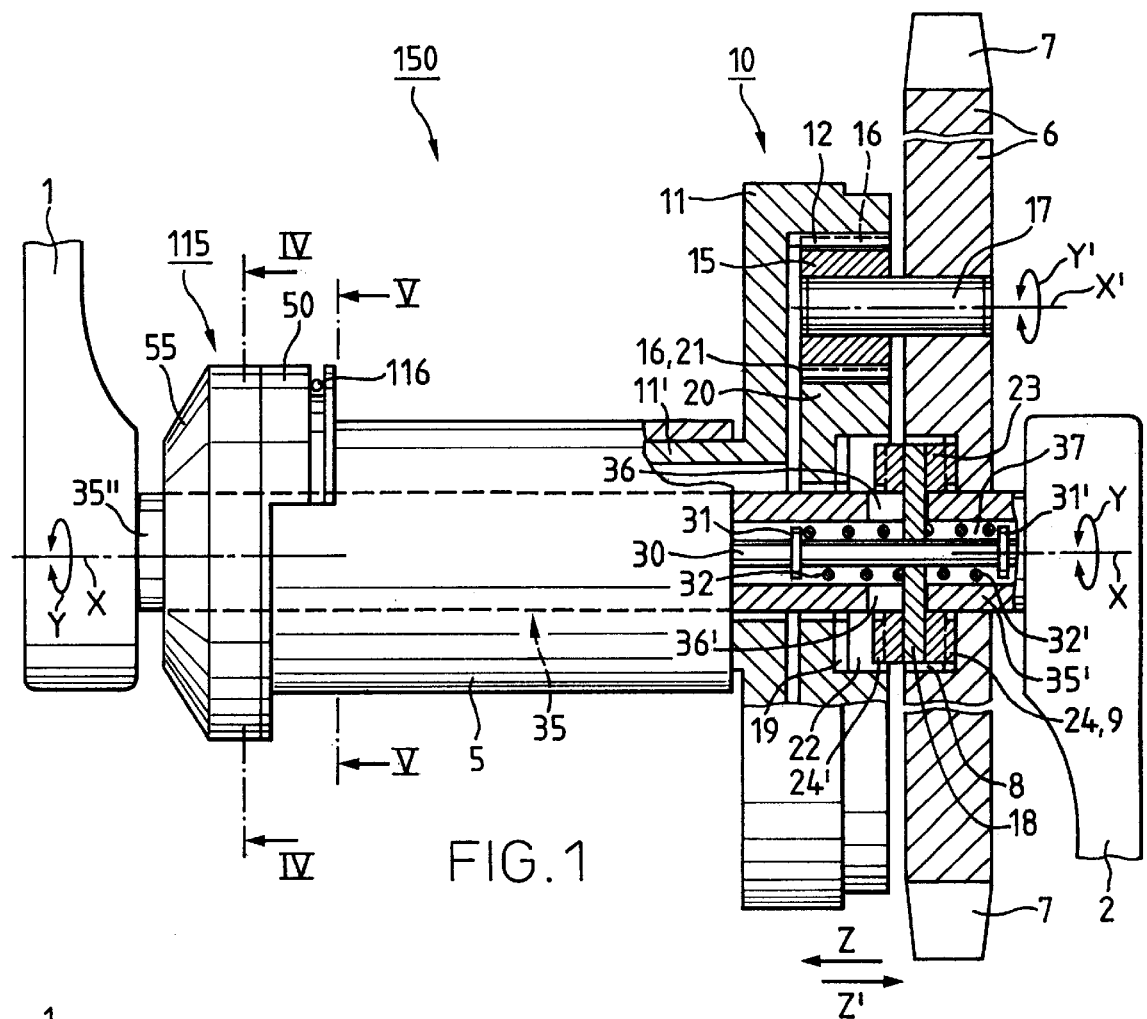
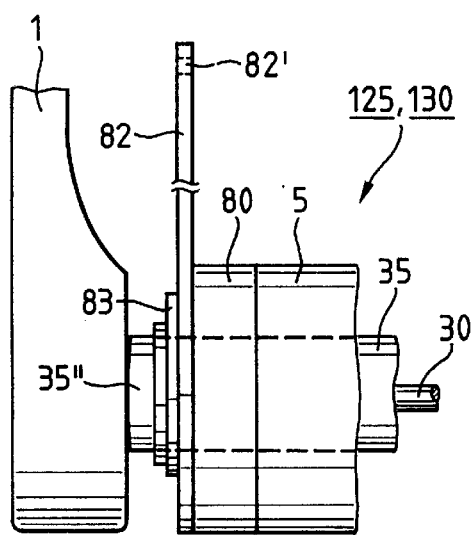
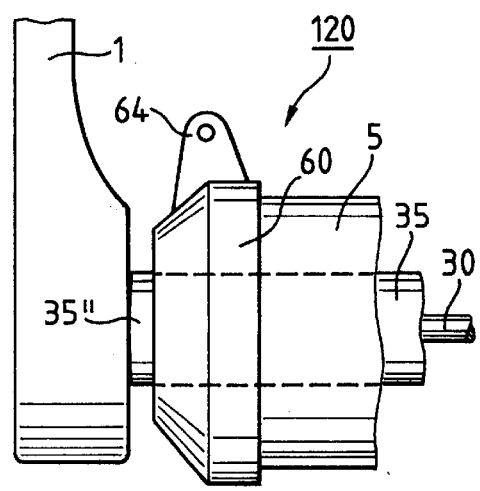
FIG. 1
FIG. 3
FIG. 2

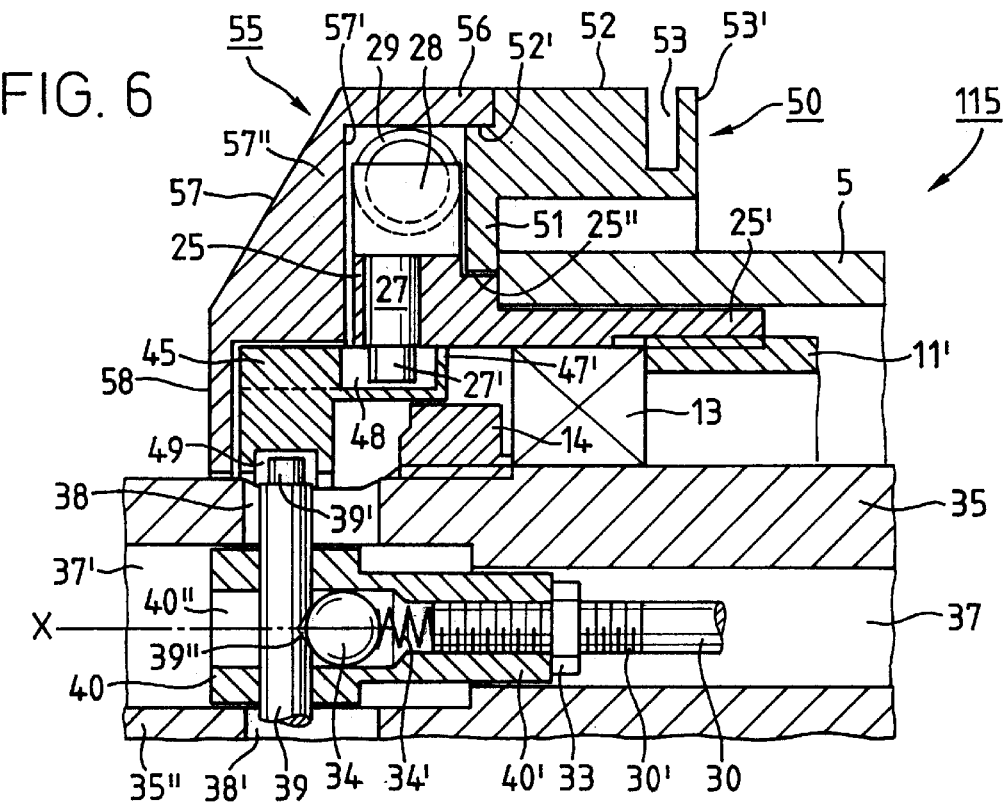
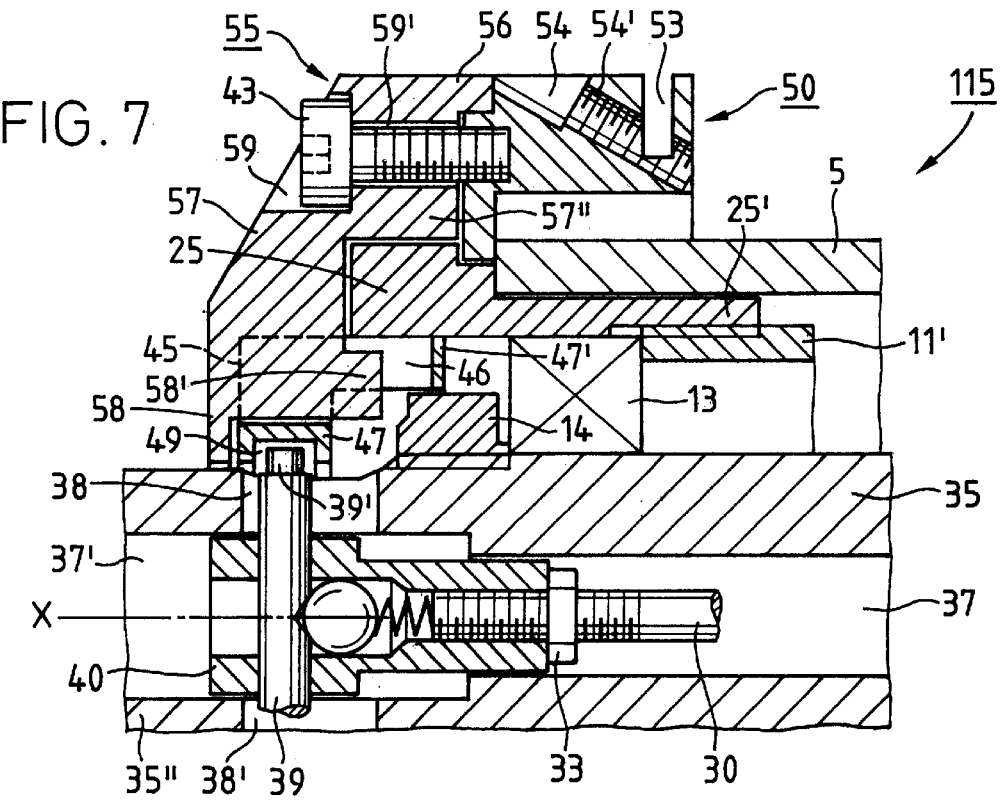

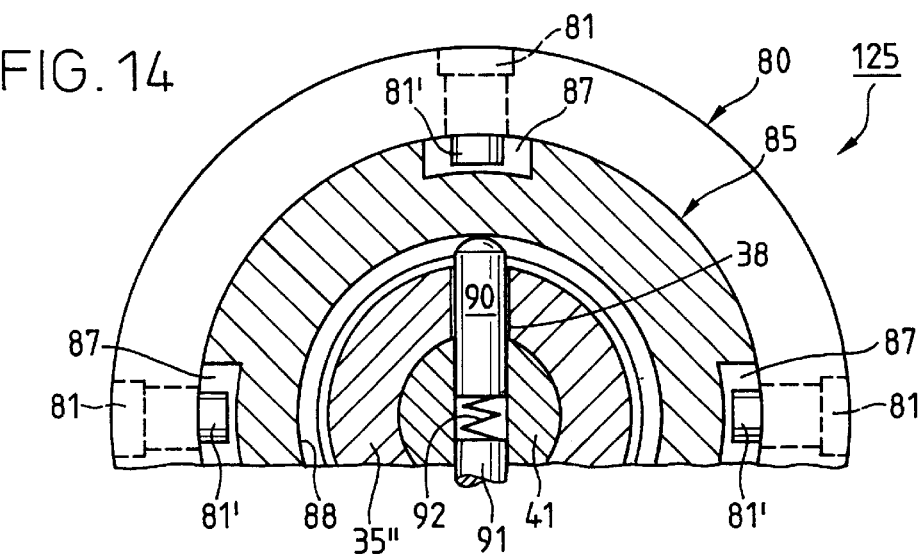
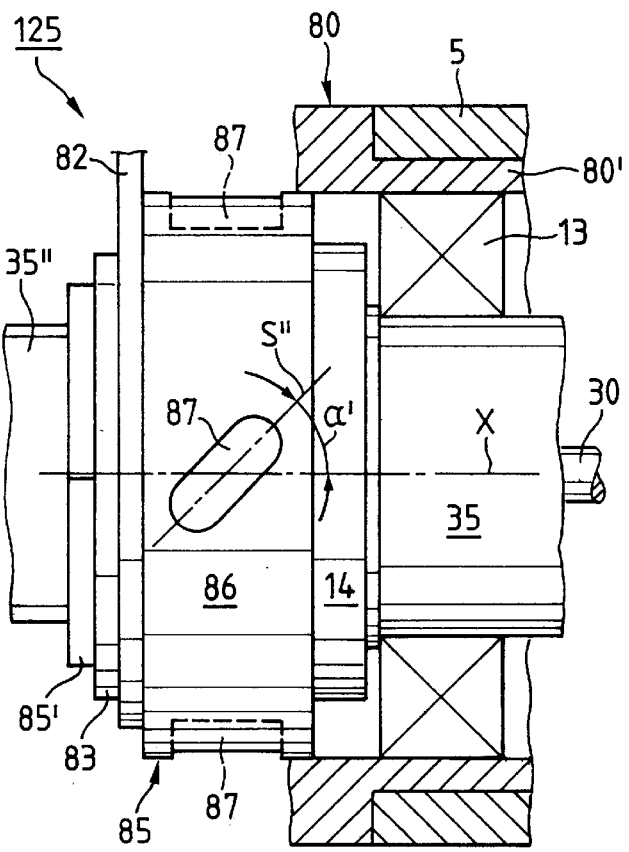
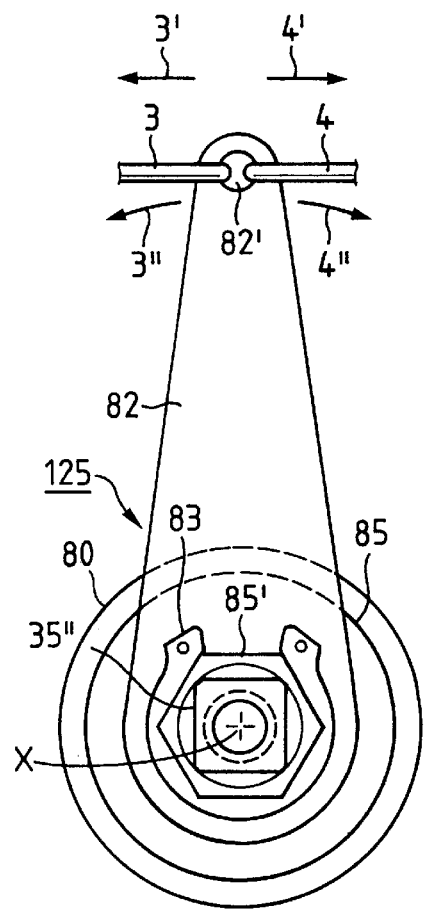

APPARATUS FOR ACTUATING A SWITCHING SHAFT OPERATIVELY CONNECTED WITH A SWITCHABLE BOTTOM BRACKET BEARING GEAR

BACKGROUND OF THE INVENTION

The invention relates to an apparatus for actuating a switch shaft which is operatively connected with a switchable bottom bracket bearing gear for a bicycle or the like and is held in a hollow-cylindrical drive shaft, which switch shaft is jointly displaceable relative to the drive shaft in the axial direction with the first coupling member which is arranged at the one end of the drive shaft rotatable about its longitudinal axis and is to be connected in a form-locked manner with the power-transmitting functional elements of the bottom bracket bearing gear.

Switchable bottom bracket bearing gears for a bicycle or the like are known from specifications (EP-A 0 562 470 and EP-A 0 666 212) in which a coupling member operatively connected with a switch shaft as well as a drive shaft can be brought into engagement with a chain wheel or with a sun wheel arranged at a distance therefrom or vice-versa for the purpose of achieving a change in the rotational speed, with the movement of the switch shaft oriented in the axial direction for the switching operation being effected by means of a switching member which is arranged on the outside of the crank and can be actuated with the foot. The individual switching member can be arranged either in the form of a thrust member arranged in a recess of the crank and in the shape of a button, or in the form of a longitudinal thrust member which is held on the outer side of the crank and is deflectable relative thereto.

SUMMARY OF THE INVENTION

The invention is based on the object of providing an apparatus by means of which the axial displacement of the individual functional elements which is required for the change in speed is facilitated substantially whilst retaining a precise switching operation and secure handling.

This object is achieved pursuant to the invention in such a way that a second coupling member is arranged on the other end of the switch shaft and is operatively connected with a control body held on the drive shaft in such a way that in the case of swivelling movement of the control body which is oriented about the longitudinal axis, which body is connected with at least one actuating member, the said control body is moved in the axial direction together with the switch shaft and in this process the first coupling member, which is arranged on the drive shaft and is displaceable in the axial direction relatively thereto, can be brought into engagement, depending on the swivelling direction, for the form-locked and non-positive operative connection of the functional elements.

BRIEF DESCRIPTION OF THE DRAWING

Further features and embodiments of the invention arise from the description below in conjunction with the patent claims and the drawing. The invention is explained below by reference to the enclosed drawing, wherein:

FIG. 1 shows a bottom bracket bearing for a bicycle or the like in a projection and partly a sectional view with associated switchable bottom bracket bearing gear as well as a first embodiment of an apparatus for actuating the bottom bracket bearing gear;

FIG. 2 shows in a projection a section of the bottom bracket bearing pursuant to FIG. 1 with a second embodiment of the apparatus for actuating the bottom bracket bearing gear;

FIG. 3 shows in a projection a section of the bottom bracket bearing pursuant to FIG. 1 with a third embodiment of the apparatus for actuating the bottom bracket bearing gear;

FIG. 6 shows the first embodiment of the apparatus for actuating the bottom bracket bearing gear in a longitudinal section pursuant to the line VI—VI in FIG. 4;

FIG. 7 shows the first embodiment of the apparatus for actuating the bottom bracket bearing gear in a longitudinal section pursuant to the line VII—VII in FIG. 4;

FIG. 14 shows the apparatus for actuating the bottom bracket bearing gear in a section pursuant to the line XIV—XIV in FIG. 13;

FIG. 15 shows a section of the apparatus pursuant to FIG. 12 with guide grooves arranged on a control body in a projection and partly in a sectional view;

FIG. 16 shows a section of the apparatus pursuant to FIG. 12 in a side view pursuant to the direction of the arrow XVI;

DETAILED DESCRIPTION OF PREFERRED EMBODIMENTS

Figure 4:
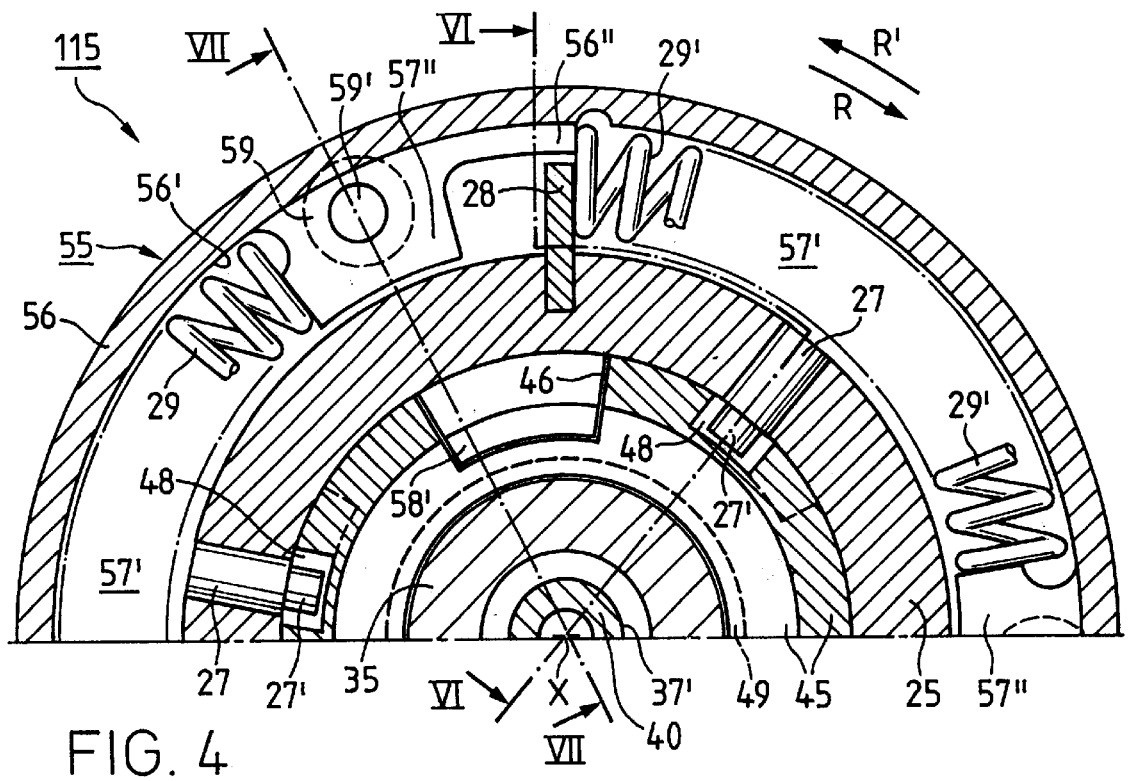
FIG. 4 shows the first embodiment of the apparatus for actuating the bottom bracket bearing gear in a sectional view pursuant to the line IV—IV in FIG. 1 as well as on an enlarged scale.

For the purpose of better explaining the invention, FIG. 1 shows a bottom bracket bearing 150 for a bicycle or the like in a projection and partly in a sectional view. At the one end of the bottom bracket bearing 150 there is arranged a switchable bottom bracket bearing gear 10 which is in operative connection with an apparatus 115 which is arranged at the other end and is used for actuating the bottom bracket bearing gear 10. FIG. 2 shows as a second embodiment an apparatus 120 for actuating the bottom bracket bearing gear 10 (FIG. 1), which apparatus is shown schematically and is arranged on the bottom bracket bearing. One can recognise the functional elements 1, 5,3 0, 35, 35" and 60, 64 which are operatively connected thereto. FIG. 3 shows as a third and fourth embodiment apparatuses 125 and 130 with the functional elements 1, 5, 30, 35, 35" and 80 for actuating the bottom bracket bearing gear 10 (FIG. 1), which apparatuses are shown in a schematical view and are arranged on the bottom bracket bearing. The individual embodiments of the apparatuses 115, 120 or 125 and 130 as well as the constructional details of the same will be described in connection with FIGS. 4 to 20 in detail.

As is shown in FIG. 1, the bottom bracket bearing 150 substantially comprises a hollow-cylindrical bottom bracket bearing casing 5, a drive shaft 35 which is held therein coaxially and is also arranged hollow-cylindrically, the bottom bracket bearing gear 10 which is operatively connected thereto and the cranks 1 and 2 which are arranged on the ends 35' and 35" of the drive shaft 35 which are mutually distanced in the axial direction. The two cranks 1, 2 are operatively connected with the drive shaft 35 in a manner not explained in closer detail and are jointly rotatable together with the same about a longitudinal axis X of the drive shaft 35 in the direction of arrow Y.

The bottom bracket bearing gear 10 shown in the embodiment and in a sectional view in FIG. 1 comprises a gear casing 11 which is held coaxially in the bottom bracket bearing casing 5 with an attached tube body 11'. In the inner space of the gear casing 11, which is not designated in closer detail, there are arranged a sun wheel 20 as well as at least two planet wheels which are distributed in the circumferential direction. At a parallel distance from the sun wheel 20 a chain wheel 6 provided with an external toothing 7 is held on the drive shaft 35. Bearing pins 17 are provided on the chain wheel 6, which pins are distributed in the circumferential direction, are arranged for bearing the planet wheels 15 and on which a planet wheel 15 is arranged which is held rotatably in the direction of the arrow Y' about the longitudinal axis X' of the same. The planet wheels 15, which are provided with an external toothing 16, are in engagement, on the one hand, with an inner toothing 12 of the gear casing 11 and, on the other hand, with an external toothing 21 of the sun wheel 20.

The chain wheel 6 as well as the disc-like sun wheel 20 are each provided with a recess 8 and 22, respectively, which is limited by a wall not designated in greater detail. The chain wheel 6 is provided with a first snap-in device 9 on the undesignated inner wall of the recess 8, which snap-in device comprises several snap-in elements (not shown) which are arranged mutually distributed in the circumferential direction. The sun wheel 20 is provided on the undesignated inner wall of the recess 22 with a second snap-in device 19 which also comprises several snap-in elements (not shown) which are arranged mutually distributed in the circumferential direction. A first coupling member 23 which is displaceable in the axial direction is arranged on the drive shaft 35 between the chain wheel 6 and the sun wheel 20. The first coupling member 23 is provided on the one side with a first snap-in device 24 and on the other side with a second snap-in device 24'. The first coupling member 23 is operatively connected by way of the driving element 18 with a switch shaft 30 penetrating the drive shaft 35 in the axial direction. The driving element 18 is guided in slots 36 and 36' which are oriented in a respective manner in the axial direction and are arranged in the drive shaft 35 diametrically opposite from one another. The drive shaft 35 comprises a through bore 37 which is oriented in the axial direction and in which the switch shaft 30 is arranged coaxially and is held with means (not shown).

A compression spring 32 and 32' is arranged on either side of the driving element 18 which is arranged on the switch shaft 30, which springs are adjustable by means of two stops 31 and 31' which are displaceable in the axial direction on the switch shaft 30 and are fixably arranged. As a result of a translatory motion of the switch shaft 30 oriented in the direction of arrow Z, the coupling member 23, with the snap-in device 24', can be brought into a form-locking engagement with the associated snap-in device 19 of the sun wheel 20 in a manner which is not shown in closer detail. As a result of a movement of the switch shaft 30 oriented oppositely in the direction of arrow Z', the other snap-in device 24 of the coupling member 23 can be brought into a form-locking engagement with the snap-in device 9 of the chain wheel 6, as is shown in FIG. 1.

The embodiment of the apparatus 115 which is arranged on the crank 150 and is shown in a projection in FIG. 1 comprises a first actuating member 55 which is arranged on the crank casing 5 as well as a second actuating member 50 which is operatively connected to the same. A tension member 116 is arranged on the second actuating member 50 and is fastened in a manner which is not shown. With the help of the tension member 116 the two actuating members 50 and 55 can be pivoted about the common longitudinal axis X. Depending on the swivelling movement (FIG. 4) of the two actuating members 50, 55 which is oriented in the direction of the arrow R or R', the functional elements which are operatively connected to the same cause the movement of switch shaft 30 oriented in the axial direction Z or Z' (FIG. 1) as well as the respective switching function of the bottom bracket bearing gear 10. The individual functional elements which are operatively connected with the two actuating members 50, 55 and the switch shaft 30 are described below in closer detail by reference to the FIGS. 4 to 8.

FIG. 4 shows the apparatus 115 along the line IV—IV in FIG. 1 in a sectional view and on an enlarged scale. One can recognise the first actuating member 55, a casing element 25, a control body 45, the hollow-cylindrical drive shaft 35 and a second coupling member 40 which is operatively connected with the switch shaft 30 and is arranged in a bore 37'. On the inner wall 57' of the first actuating member 55, which wall is limited in the radial direction by a annulus-shaped flange 56, there are arranged projections 57" mutually distributed over the circumferential direction. Shoulders 56" are provided on the one side of the projections 57", which shoulders are attached thereto and are oriented parallel to the inner side 56' of the annulus-shaped flange 56. A compression spring is arranged between the projections 57" which are mutually distributed in the circumferential direction, with two compression springs 29 and 29' being shown in FIG. 4 for example. The compression springs 29, 29' are supported with the one end on respective stops 28 which are respectively arranged on the casing element 25 distributed over the circumferential direction as well as on the face edge (not designated in closer detail) of the shoulder 56" and with the other end on the face side (not designated in closer detail) of the respectively associated projection 57". Respectively arranged bores 59, 59' are provided in the projections 57" of the first actuating member 55 for receiving fastening screws 43 (FIG. 7). Actuating members 27 are arranged in the casing element 25 mutually distributed in the circumferential direction and are fastened with means which are not shown. The actuating members 27 are arranged with an attached nose 27' in respective guide grooves 48 which are arranged mutually distributed on the circumference of the control body 45. Stop cams 58' are arranged on the inner wall 57' of the first actuating member 55 mutually distributed in the circumferential direction, which cams engage in a coupling manner in respectively associated recesses 46 of the control body 45. The control body 45 is operatively connected in a torsionally rigid manner with the first actuating member 55 by means of the stop cams 58'.

In the embodiment of the elements 55, 25 and 45 which are partly shown in FIG. 4, three projections 57", compression springs 29, stops 28, actuating members 27 and stop cams 58' are provided in an arrangement distributed over the circumferential direction. It is also possible to provide only two or even several elements 57"; 29; 28; 27 and 58' arranged mutually distributed in the circumferential direction.

Figure 5:
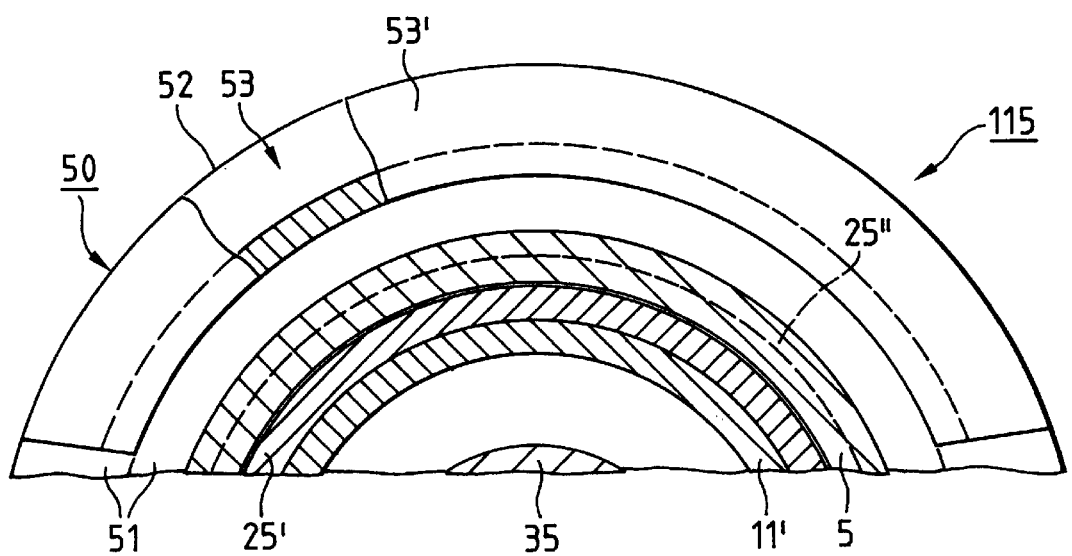
FIG. 5 shows the first embodiment of the apparatus for actuating the bottom bracket bearing gear in a sectional view pursuant to the line V—V in FIG. 1 as well as on an enlarged scale.

In FIG. 5 the apparatus 115 is shown in a sectional view along the line V—V in FIG. 1 and on an enlarged scale. One can recognise the second actuating member 50 which is provided with an arc-shaped sectional element 52 and the partly shown first actuating member 55 and the partly shown crank casing 5. The second actuating member 50 is arranged with an attached disc-shaped flange 51 in an annular groove 25" of the casing element 25. In the sectional element 52, which is shown in FIG. 5 in a partly opened view, an arcshaped groove 53 is arranged which is limited by a wall 53' and in which the tension member 116 as shown in FIG. 1 is arranged and fastened. Moreover, the partly shown pipe body 11' is shown in FIG. 5.

FIG. 6 shows the first apparatus 115, which is shown as a longitudinal section according to line VI—VI in FIG. 4, for actuating the bottom bracket bearing gear 10 and one can recognise the bottom bracket bearing casing 5, the end piece of the pipe body 11' of the gear casing 11 (FIG. 1), the drive shaft 35 which is rotatable about the longitudinal axis X as well as a section of the switch shaft 30 which is arranged coaxially therein. A rolling bearing 13 is arranged on the drive shaft 35 between a thrust collar 14 screwed on to the second section 35" of the same and the face side of the tube body 11'.

Moreover, one can recognise in FIG. 6 the second actuating member 50 which is shown in a profile section, the first actuating element 55 which is operatively connected to the same and is shown in a profile section, the casing element 25 which is arranged coaxially in the bottom bracket bearing casing 5 with a cylindrical section 25' and is fixedly connected with the pipe body 11' by a screwed connection as well as the control body 45 which is provided with an inner hub ring 47 and with an outer control ring 47'. The casing element 25 which is provided on the outer circumference with the stops 28 for the compression spring 29 comprises an annulus-shaped shoulder 25" on which the second actuating member 50 with the annulus-shaped flange 51 is arranged and held. The second actuating member 50 comprises on the outer circumference of the segment element 52 the groove 53 which is limited by the wall 53' as well as an annulus-shaped shoulder 52' on which the first actuating member 55 with the annulus-shaped flange 56 is arranged and held.

The first actuating member 55 comprises the annulus-shaped flange 56 a first face wall 57 which is attached thereto as well as an annulus-shaped second face wall 58 which is attached thereto. Projections 57" are attached on the inner wall 57' of the first face wall 57 and are mutually distributed in the circumferential direction (FIG. 4). In the zone of the second face wall 58 the stop cams 58' are arranged on the inner side (not designated) of the said wall, which cams are arranged mutually distributed and engage into the recesses 46 of the control body 45. The control body 45 comprises the guide grooves 48 which are arranged distributed on the outer control ring 47' in the circumferential direction and in which the pins 27' of the actuating members 27 are guided, which members are arranged in the casing element 25 and are fastened by means which are not shown. The hub ring 47 of the control body 45 is provided with an annular groove 49 in which a driving pin 39 is arranged and guided, which pin is operatively connected with the drive shaft 35 and with the coupling member 40 which is arranged in the bore 37' thereof.

The driving pin 39, which is provided with a head 39' provided with an offset arrangement, is guided in longitudinal slots 38, 38' which are respectively oriented in the axial direction and are arranged diametrically towards one another on the drive shaft 35. The driving pin 39 which is arranged transversally to the longitudinal axis X is held on the second coupling element 40. The coupling element 40 comprises a section 40' which is provided with an inner thread and in which the switch shaft 30 provided with a thread 30' is screwed in and is held by a nut 33. At the forward end the coupling element 40 is provided with a recess 40" which is oriented in the axial direction. A compression spring 34' is arranged in the recess 40", which spring is in engagement with the one end on the switch shaft 30 and with the other end with a snap-in ball 34. The snap-in ball 34 is arranged in a notch 39" provided on the driving pin 39 in such a way that the driving pin 39 with the head 39' provided at the end is arranged and guided centrally with respect to the longitudinal axis X in the annular groove 39 of the control body 45.

FIG. 7 shows the second actuating member 50 represented in a profile section and the first actuating member 55, which is operatively connected to the same and is shown in a profile section, according to the line VII—VII in FIG. 4 also in a longitudinal sectional view. Departing from FIG. 6, in the second actuating member 50 pursuant to FIG. 7 there is represented a bore 54, 54' for fastening the tension member 116 (FIG. 1) arranged in the arc-shaped groove 53. Moreover, FIG. 7 shows a bore 59 and 59', arranged in the area of the projection 57", to receive a fastening screw 43 which mutually connects the two actuating members 55 and 50 and is preferably arranged in the zone of the projections 57" which are distributed in the circumferential direction. On the inner side of the face wall 58 of the first actuating member 55 there is arranged at least one snap-in cam 58'. Preferably snap-in cams 58' are arranged which are distributed in the circumferential direction which in the compiled condition (FIG. 7) engage in a form-locked and non-positive manner in the recesses 46 of the control body 45 which are arranged in a distributed manner on the circumference of the outer control ring 47". Moreover, FIG. 7 shows the control body 45 with the inner hub ring 47 and the outer control ring 47' as well as the elements 5; 11'; 13; 14; 25; 30; 33; 35; 35"; 39 and 40 which have been described above in detail in connection with FIG. 6.

Figure 8:
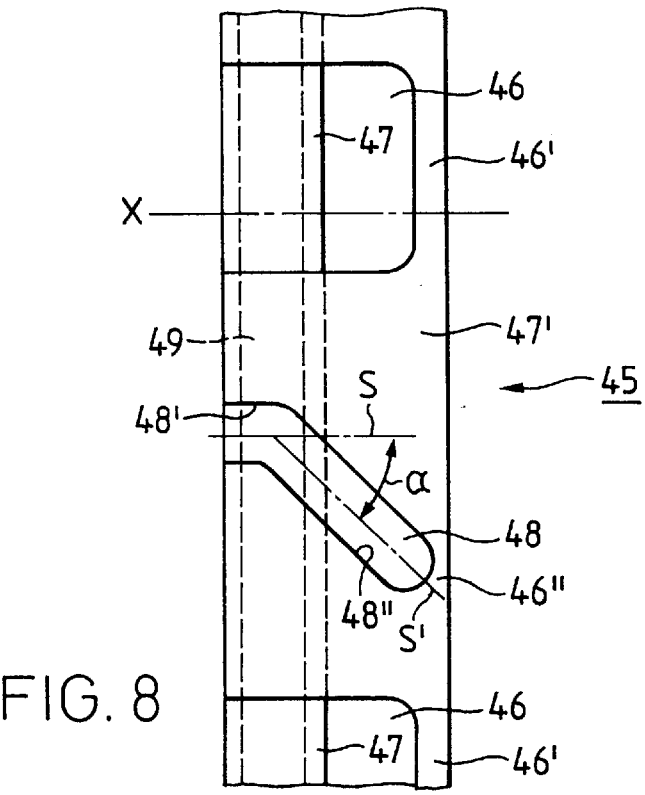
FIG. 8 shows a section of a control body for the apparatus pursuant to FIGS. 6 and 7 for actuating the bottom bracket bearing gear in a developed and top view.

FIG. 8 shows in a developed view a section of the control body 45 for the apparatus 115 on an enlarged scale and one can recognise the inner hub ring 47 with the annular groove 49 arranged therein for the head element 39' of the driving pin 39 (FIGS. 6,7) as well as the outer control ring 47'. On the outer control ring 47' there are arranged the recesses 46, which are arranged at a distance from one another, for the snap-in cams 58' (FIG. 7) of the first actuating member 55 as well as the guide grooves 48 which are arranged in between and are arranged substantially as curved paths. In the represented embodiment the control body 45 is provided with three recesses 46 which are arranged distributed in the circumferential direction and are limited by a wall 46' as well as with three guide grooves 48 which are arranged in between. The single guide groove 48 comprises a section 48' which is arranged with a theoretical first axis S parallel to the theoretical longitudinal axis X as well as a section 48" which is arranged inclined with a second axis S' with respect to the first axis S under an acute angle α and which is provided with a round-off at the end. The section 48" of the guide groove 48 is limited in the represented embodiment by wall 46" of the outer control ring 47'. The acute angle α, which exists between the two axes S and S', of the section 48" with respect to the first section 48' is 45° for example. In a modification (not shown) it is also possible to arrange the second section 48" of the guide groove 48 continuously, i.e. without the wall 46'.

Figure 9:
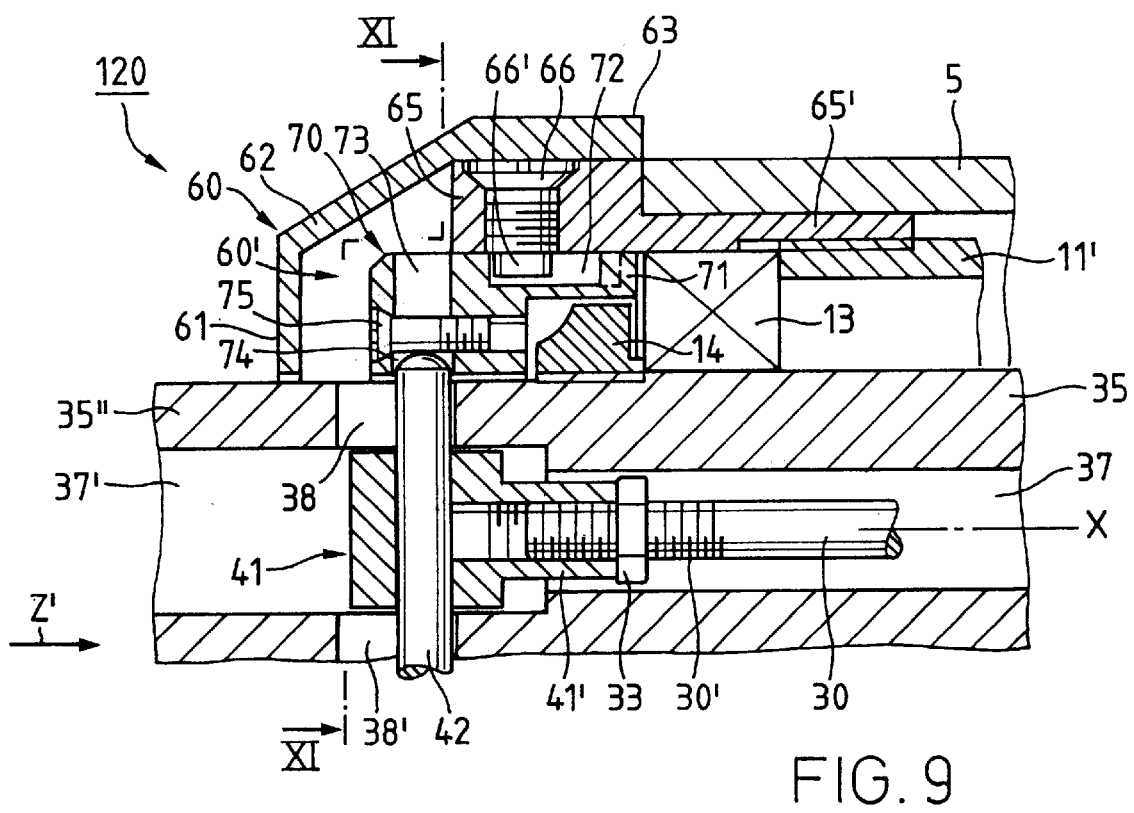
FIG. 9 shows in a longitudinal section the second embodiment of the apparatus pursuant to FIG. 2 for actuating the bottom bracket bearing gear in a first position.

FIG. 9 shows the second apparatus 120 pursuant to FIG. 4, represented as a longitudinal section and on an enlarged scale. It is used for actuating the bottom bracket bearing gear 10 and one can recognise the bottom bracket bearing gear casing 5, the end element of the pipe body 11', a casing element 65 with the cylindrical section 65', the drive shaft 35, the rolling bearing 13 which is held thereon against axial displacement by the thrust collar 14, the switch shaft 30 provided with the threaded element 30' as well as a coupling element 41. The coupling element 41 is arranged in the bore 37, 37' of the drive shaft 35 and is screwed on to the threaded element 30' of the switch shaft 30 with the section 41' and is secured by the nut 33. The elements as mentioned above are arranged substantially analogously to the first apparatus 115 (FIGS. 6, 7).

Figure 10:
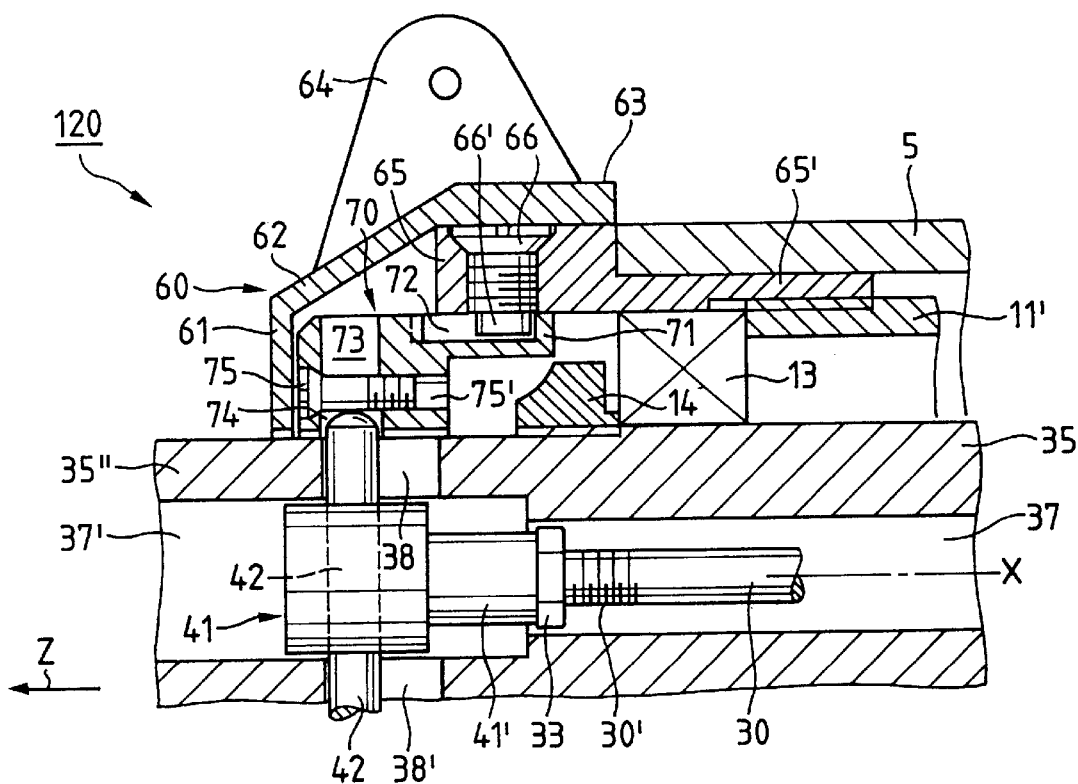
FIG. 10 shows the apparatus pursuant to FIG. 9 in a second position.
Figure 11:
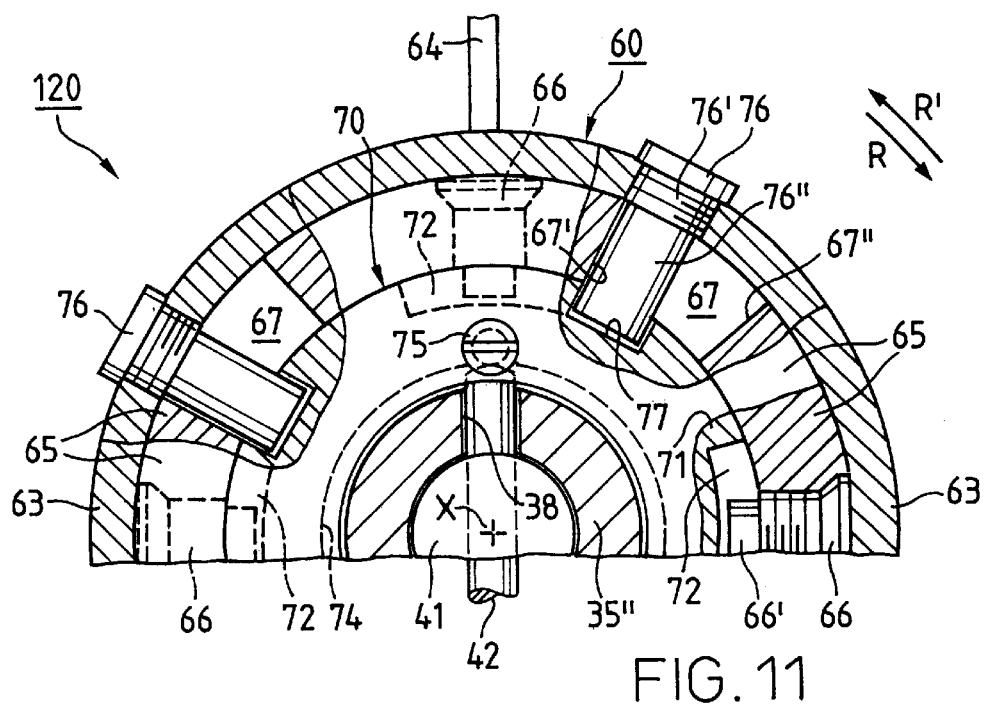
FIG. 11 shows the apparatus for actuating the bottom bracket bearing gear pursuant to FIG. 1 in a section pursuant to line XI—XI in FIG. 9.

Departing from the first apparatus 115 pursuant to FIGS. 4 to 8 the second apparatus 120 pursuant to FIGS. 9 to 11 comprises an actuating member 60 with the approximate shape of a hood as well as a control body 70 provided with a control ring 71. Several guide grooves 72 are arranged on the control ring 71 distributed in the circumferential direction, with FIG. 9 only showing the one guide groove 72. The layout and arrangement of the guide grooves 72 arranged on the control ring 71 of the control body 70 corresponds for example to the embodiment of the control body 85 which is described in an analogous manner below in connection with FIG. 15.

In the second apparatus 120 pursuant to FIG. 9 the control body 70 is in operative connection with the drive shaft 35 by way of a driving pin 42 which is guided in an inner annular groove 74 thereof and in the longitudinal slots 38, 38' of the second section 35" of the drive shaft 35 as well as with the switch shaft 30 by way of a coupling element 41 which is arranged therein. In the control body 70 there is provided a bore 73 which is arranged transversally to the longitudinal axis X and is preferably arranged as a pocket hole and in which the driving pin 42 is inserted and is secured by a screw 75 arranged transversally thereto. The screw 75 is screwed into a thread 75' (FIG. 10) provided on the control body 70. In a modification which is not shown in closer detail, the driving pin 42 is arranged as a so-called dowel pin and is held in a self-clamping manner in the coupling element 41, so that an additional securing by the screw 75 is not necessary.

At least two, but preferably several actuating members 66 distributed over the circumferential direction are arranged on the casing element 65. The individual actuating member 66 which is held with a threaded element in the casing element 65 comprises an attached pin 66' which engages in the guide groove 72 which is arranged on the outer circumference of the control ring 71. Several guide grooves 72 and actuating members 66 (FIG. 11) distributed in the circumferential direction are arranged for example on the control ring 71 of the control body 70.

Departing from the first position as shown in FIG. 9, FIG. 10 shows the apparatus 120 in a second position in which the control body 70 is represented in a displaced manner by a swivelling movement of the actuating member 60 oriented about the longitudinal axis X in the direction of arrow R (FIG. 11) relative to the face side (not designated) of the casing element 65. In this position (FIG. 10) the individual elements of the bottom bracket bearing gear 10 (FIG. 10) are arranged with respect to one another in such a way that the coupling element 23 is in engagement by the snap-in device 24' with the associated snap-in device 19 of the sun wheel 20 (not shown).

As is shown in FIGS. 9 and 10, the actuating element 60, which is arranged approximately in the shape of a hood and is provided with an inner chamber 60', comprises a first face wall 61, a second face wall 62 which is attached thereto in an inclined way as well as an annulus-shaped flange 63 which is attached thereto. The actuating member 60 is held with the annulus-shaped flange 63 on the outer diameter of the casing element 65. In the apparatus 120 pursuant to FIGS. 9 and 10 the elements which are required for the change of the rotational speed in the bottom bracket bearing gear 10 (FIG. 1) are arranged in the inner chamber 60' of the actuating member 60 and protected against outside manipulation and soiling. A bracket 64 is arranged and fastened on the outer circumference of the actuating member 60 for fastening a tension member or the like, which bracket can be used to actuate the apparatus 120 for the change in rotational speed of the bottom bracket bearing gear 10 (FIG. 1) in a manner which is not shown.

FIG. 11 shows the apparatus 120 in a sectional view along the line XI—XI in FIG. 9 and one can recognise the outer annulus-shaped flange 63 of the actuating member 60, the casing element 65, the control body 70 with the control ring 71, the second section 35" of the drive shaft 35 as well as the coupling element 41. The coupling element 41 is operatively connected with the control body 70 by way of the driving pin 42. The driving pin 42 is guided in the slots 38, 38' of the drive shaft 35 in the axial direction (FIGS. 9,10) as well as in the inner annular groove 74 of the control body 70 in the circumferential direction (FIG. 11) and secured by the screw 75. Moreover, the actuating members 66 are shown which are arranged in the casing element 65, are distributed over the circumference and each engage with the attached pin 66' in the guide grooves 72 which are arranged on the outer circumference of the control ring 71.

At least two, but preferably several second actuating members 76 are arranged in the circumferential direction distanced from one another on the outer circumference of the actuating member 60. The second actuating members 76 are screwed into the outer annulus-shaped flange 63 of the actuating member 60 with a threaded element 76' and are arranged with an attached pin 76" in a recess 67 of the casing element 65. The individual actuating member 76 is arranged with the pin 76" in a form-locked manner in an associated recess 77 of the control body 70, which recess is arranged as a pocket hole. The recess 67 arranged for the guidance of the actuating member pin 76" is limited by two distanced walls 67' and 67". The outer annulus-shaped flange 63 can also be arranged in such a way that the screwed-in actuating members 76 are aligned flush with the outer surface (not shown).

As a result of the second actuating members 76 which are arranged distributed in the circumferential direction the actuating member 60 is operatively connected with the control body 70. During the swivelling movement of the actuating member 60 which is oriented about the longitudinal axis X in the direction of arrow R (FIG. 11), the control body 70 is displaced by the forced guidance of pin 76" in the guide groove 72 in the inner chamber 60' relative to the face side (not designated) of the fixed casing element 65 in accordance with the direction of arrow Z (FIG. 10). During the swivelling movement of the actuating member 60 which is oriented oppositely in the direction of the arrow R', the control body 70 is pushed back to the end position pursuant to FIG. 9 according to the direction of the arrow Z'. The swivelling movement of the mutually operatively connected elements 60 and 70 relative to the fixed casing element 65 is limited by the actuating members 76 which can be brought into engagement with the walls 67',67" of the recesses 67.

Figure 12:
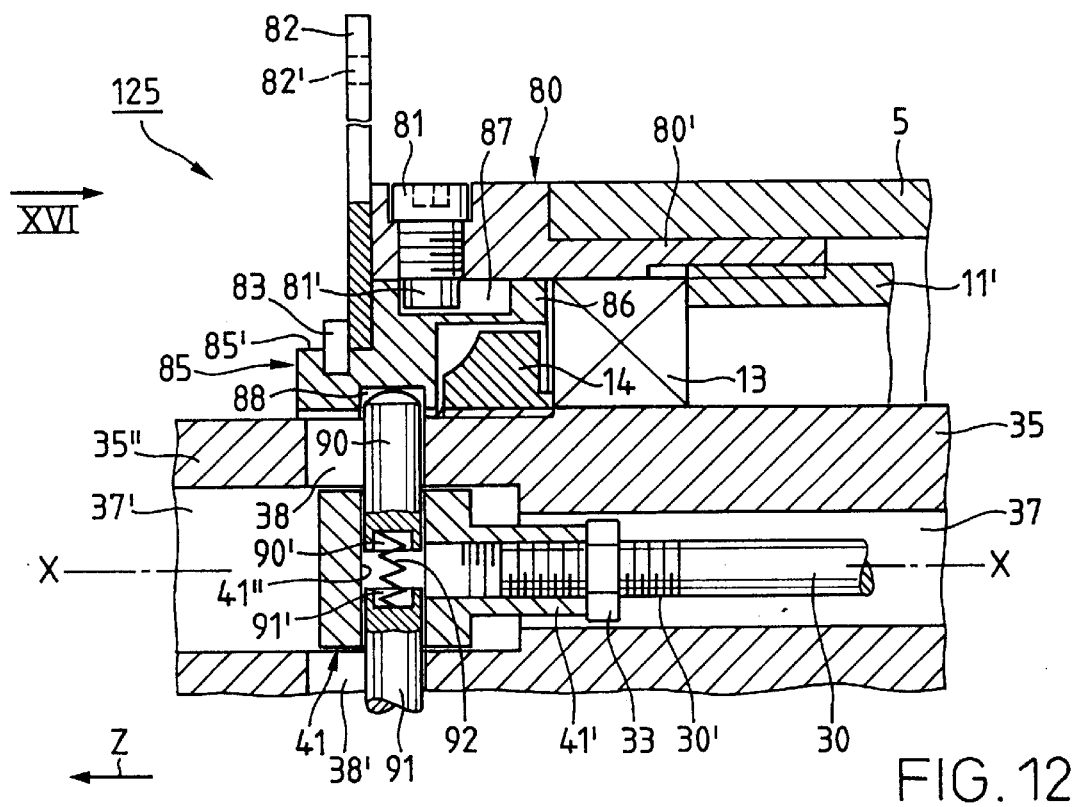
FIG. 12 shows in a longitudinal section the third embodiment of the apparatus pursuant to FIG. 3 for actuating the bottom bracket bearing gear in a first position.

FIG. 12 shows the third apparatus 125, represented in a longitudinal section, for the actuation of the bottom bracket bearing gear 10 (FIG. 1) and one can recognise the bottom bracket bearing gear casing 5, the end element of the pipe body 11', a casing element 80 with the cylindrical section 80', the drive shaft 35 provided with the bore 37, 37', the rolling bearing 13 which is held thereon with the thrust collar 14 against axial displacement, the switch shaft 30 provided with the threaded element 30' and the coupling element 41. The coupling element 41 is arranged in the forward bore 37' of the drive shaft 35 and screwed on to the threaded element 30' of the switch shaft 30 with the section 41' and secured by nut 33. The elements as mentioned above are arranged substantially analogously to the second apparatus 120.

Departing from the second apparatus 120 pursuant to FIGS. 9 to 11, in the third embodiment of the apparatus 125 pursuant to FIGS. 12 to 16 the control body 85 for the change of rotational speed of the bottom bracket bearing gear 10 (FIG. 1) is achieved by means of a lever 82 which is swivellable about the horizontal longitudinal axis X. The lever 82 which is operatively connected with the control body 85 is provided at the upper end with an opening 82' which is arranged for fastening the tension and thrust members 3 and 4 which are shown schematically in FIG. 16.

The apparatus 125 further comprises the control body 85 which is arranged in the casing element 80 and is provided with a control ring 86. Several guide grooves 87, which are arranged distributed in the circumferential direction, are provided on the control ring 86, with the arrangement thereof being described below in connection with FIG. 15. At least two, but preferably several actuating members 81 distributed in the circumferential direction are arranged on the casing element 80, which members engage in the respectively associated guide groove 87 of the control body 85 with an attached pin 81'.

The control body 85 is provided on the face side with a section 85' which is arranged for example, polygonally, but preferably hexagonally in the profile cross section, and on which the lever 82 is arranged with a similarly arranged recess (not shown) and is operatively connected in a form-locking manner with the control body 85. The lever 82 is secured against axial displacement by a snap ring 83 which is inserted in an annular groove 84 arranged in the section 85'. The control body 85 is provided with an inner annular groove 88 in which at least two driving bolts 90 and 91 which are arranged equiaxed with respect to one another and are held in the coupling member 41 are guided in an engaging manner. The driving bolts 90 and 91 are arranged in a bore 41" of the coupling member 41, which bore is oriented transversally to the longitudinal axis X. The two driving pins 90 and 91 which are guided in the longitudinal slots 38, 38' of the drive shaft 35 are each provided on the facing ends with a pocket-hole-shaped recess 90' and 91'. As is shown in FIG. 12 partly in a sectional view, a compression spring 92 is arranged in the compiled condition between the driving pin 90 and 91, which spring is held with the one end in the recess 90' and with the other end in the recess 91'. The compression spring 92 causes the driving pins 90 and 91, which are guided in the slots 38 and 38' of the drive shaft 35 and are operatively connected with t he coupling element 41, to be held in contact with the preferably rounded-off ends (not designated) in the annular groove 88 of the control body 85. The coupling element 41 with the individual elements which is held in the bore 37, 37' of the drive shaft 35 is operatively connected with the 12 switch shaft 30, as has been explained above in connection with FIG. 9.

Figure 13:
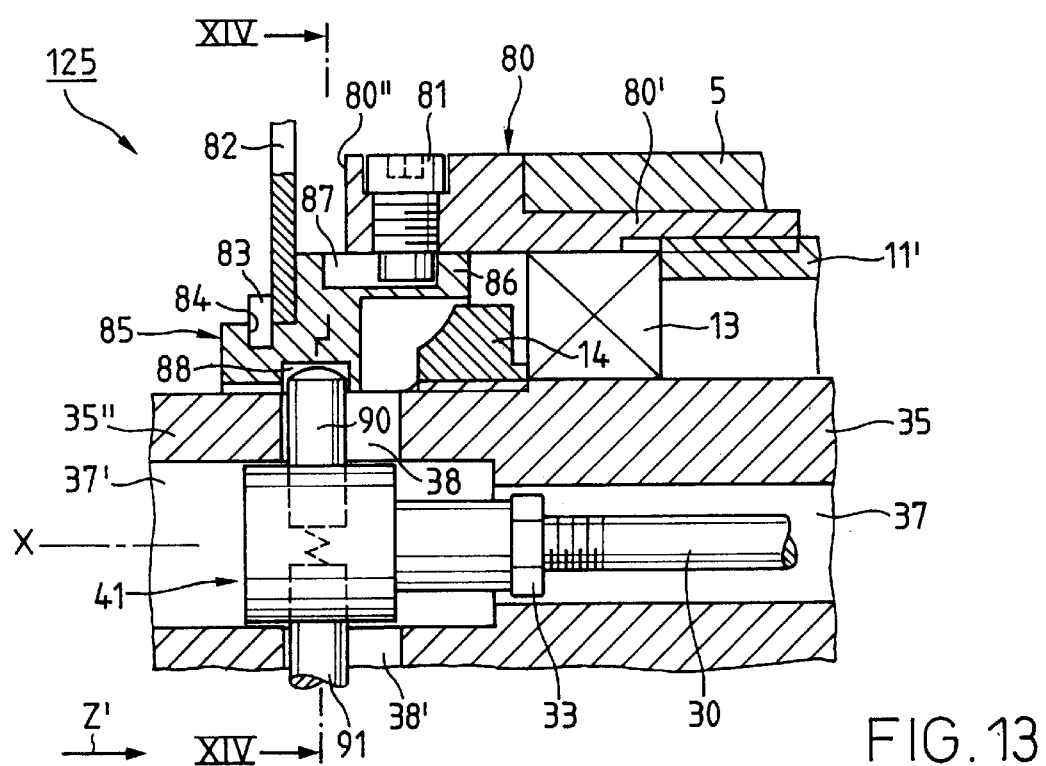
FIG. 13 shows the apparatus pursuant to FIG. 12 in a second position.

Departing from the first position as is represented in FIG. 12, FIG. 13 shows the apparatus 125 in a second position in which the control body 85 is displaced in the axial direction by a swivelling movement of the lever 82 relative to the face side 80" of the casing element 80 according to the direction of arrow Z. In this position the individual elements of the bottom bracket bearing gear 10 (FIG. 1) are arranged with respect to one another in such a way that the coupling member 23 is in engagement with the one snap-in device 24' with the associated snap-in device 19 of the sun wheel 20 (not show n). Moreover, one can see in FIG. 13 the elements 5; 11'; 13; 14; 30; 33; 35; 41; 90 and 91 as have been described above in connection with FIG. 12.

In FIG. 14 the apparatus 125 is shown along the line XIV—XIV in FIG. 13 in a sectional view, and one can recognize the casing element 80 and the guide grooves 87 for the pins 81' of the actuating members 81, which grooves are arranged on the outer circumference of the control body 85 at a distance from one another. Moreover, one can see the coupling element 41 which is held in the second section 35" of the drive shaft 35 as well as the driving pins 90 and 91 which are arranged therein and are distanced by the compression spring 92 and are arranged with the one end (not designated) in the annular groove 88.

FIG. 15 shows the apparatus 125 in a projection and partly in a sectional view. One can recognize the bottom bracket bearing gear casing 5, the partly shown casing element 80, the control body 85, the drive shaft 35, the thrust collar 14, the rolling bearing 13, the lever 82 which is arranged on the control body 85, the section 35" of the drive shaft 35 which penetrates the control body 85 as well as the switch shaft 30 arranged therein. Moreover, FIG. 15 shows the guide grooves 87 which are arranged on the outer circumference of the control ring 86 and which are arranged as oblong recesses which are rounded off at the ends. The guide grooves 87 are arranged with their axis of symmetry S" obliquely under an acute angle α' with respect to the theoretical longitudinal axis X of apparatus 125, with the acute angle α' being 45° for example.

FIG. 16 shows the apparatus 125, which is shown in a side view pursuant to the direction of arrow XVI in FIG. 12, for actuating the switchable bottom bracket bearing gear 10 pursuant to FIG. 1 and one can recognize the casing element 80, the second section 35" of the drive shaft 35, the carrying element 85' of the control body 85, which element is preferably arranged as a hexagon for example, as well as the lever 82 which is secured by the snap ring 83. At the upper end of the lever 82 there are attached two tension and thrust members 3 and 4 in the opening 82', which members are shown schematically and by means of which the lever 82 is pulled in the direction of the arrow 3' and 4' and can be swivelled simultaneously together with the control body 85 and the elements which are operatively connected thereto about the horizontal axis X. The swivelling movement of the lever 82 which is oriented according to the direction of arrow 3" and 4", and of the control body 85 which is operatively connected thereto, is limited by the length (not designated) of the guide grooves 87 (FIG. 15).

Figure 17:
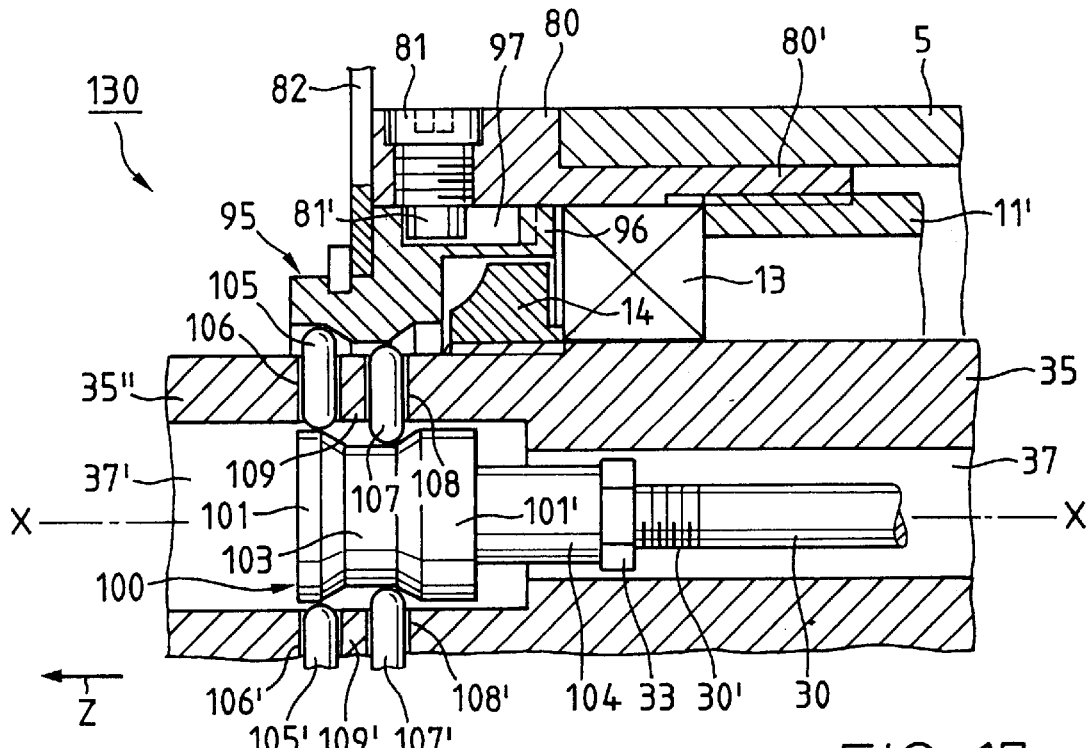
FIG. 17 shows in a longitudinal section a variant of the apparatus pursuant to FIG. 12 in a first position, which apparatus is arranged for actuating the bottom bracket bearing gear.
Figure 18:
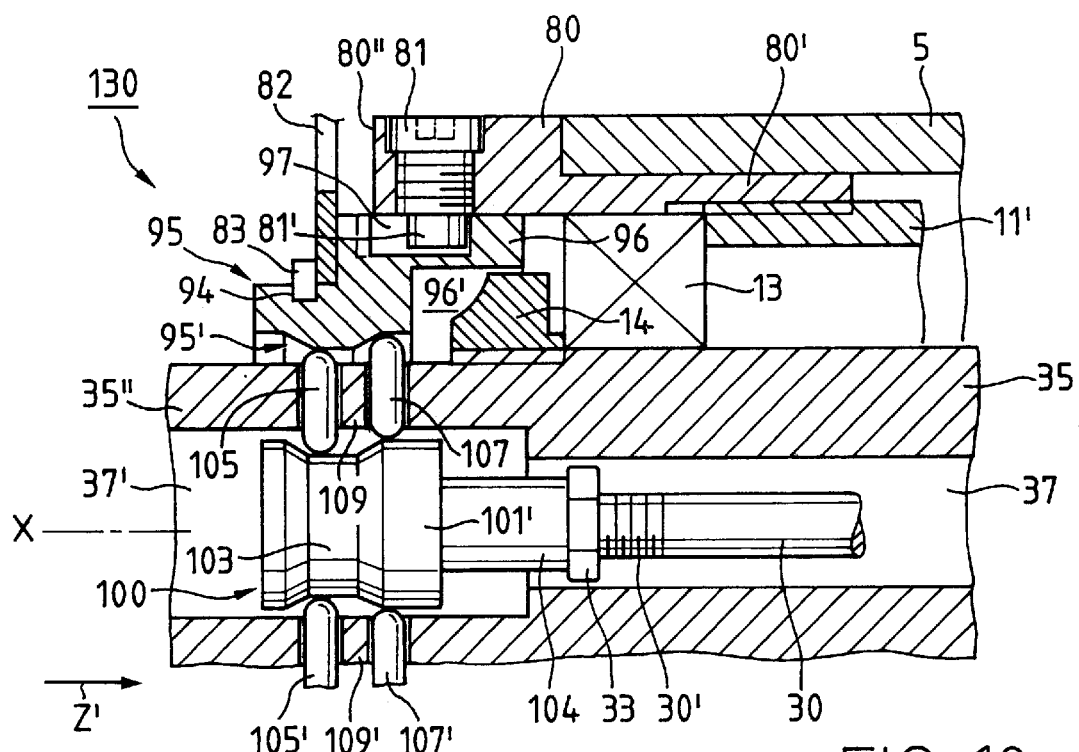
FIG. 18 shows the apparatus pursuant to FIG. 17 in a second position.

FIGS. 17 and 18 shows as a further modification the apparatus 130 in a longitudinal section, which apparatus is arranged for actuating the bottom bracket bearing gear 10 (FIG. 1). One can recognize the bottom bracket bearing gear casing 5, the end portion of the pipe body 11', cylindrical element 80 with the cylindrical section 80', the drive shaft 35, the rolling bearing 13 which is held thereon against axial displacement by the thrust collar 14, the switch shaft 30 which is provided with the threaded element 30' as well as a coupling element 100 which is operatively connected thereto. The coupling element 100 is arranged in the bore 37' of the drive shaft 35 and is screwed with the rear section 104 on to the threaded element 30' of the switch shaft 30 and is secured by the nut 33. The aforementioned elements are arranged substantially analogously to the aforementioned apparatus 125 which has been described in connection with the FIGS. 12 to 16. Moreover, one can recognize in FIG. 17 and 18 a control body 95, which is arranged in the casing element 80, with a lever 82 which is arranged thereon and is held on the control body 95 by means of a snap ring 93 arranged in an annular groove 94. The control body 95 is provided with a control ring 96 which is provided with guide grooves 97 which are distributed with respect to one another on its outer circumference. The guide grooves 97 are arranged and provided analogously to the guide grooves 87 which were described above in connection with FIG. 15 and are provided on the control ring 86 of the control body 85. Moreover, FIGS. 17 and 18 show the actuating member 81 which is arranged in the casing element 80 and is arranged with the pin 81' in the guide groove 97 of the control body 95. Departing from the position as shown in FIG. 17, FIG. 18 shows the apparatus 130 in a second position. Here the control body 95 is displaced relative to the face side 80" of the casing element 80 according to the direction of arrow Z (FIG. 17).

In the variant pursuant to FIG. 17 the control body, which is provided in its inner space with an inner jacket surface 95' (FIG. 19) arranged in a graduated manner, is in an operative connection by way of at least two first cylinder pins 105, 105', which are distributed in the circumferential direction, as well as by way of at least two second cylinder pins 107, 107', which are arranged in the axial direction at a distance therefrom and are distributed in the circumferential direction, with the coupling element 100 which is provided with a jacket surface 100' (FIG. 20) arranged in a graduated manner. The cylinder pins 105, 105' as well as 107, 107' which are arranged between the inner jacket surface 95' of the control body 95 and the outer jacket surface 100' of the coupling element 100 are arranged in the second section 35" of the drive shaft 35 in respectively arranged bores 106, 106' and 108, 108' which are mutually separated by a bridge 109, 109'. The cylinder pins 105, 105' and 107, 107' are rounded off at the respective ends which face the two jacket surfaces 95' and 100', with the rounding off preferably being arranged in a spherical shape.

At this point notice shall be taken that in a variant which is not shown it is also possible to provide superimposed balls (not shown) in the bores 106, 106' and 108, 108' of the second section 35" of the drive shaft 35 instead of the cylinder pins 105, 105' and 107, 107'.

Figure 19:
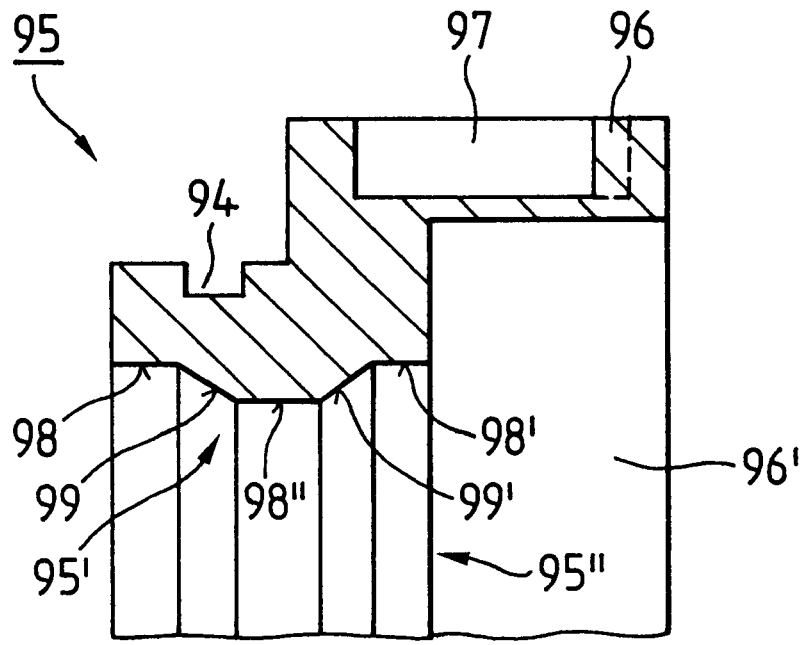
FIG. 19 shows a section of a control body for the apparatus pursuant to FIGS. 17 and 18 in a sectional view.

FIG. 19 shows a section of the control body 95 which is shown on an enlarged scale as well as in a sectional view. One can recognize the control ring 96 which is provided with a cylindrical recess 96', the guide groove 97 which is provided with a cylindrical recess 96', the one guide groove 97 which is arranged on the outer circumference thereon as well as the section with the inner space 95" which is in connection with the recess 96'. The inner space 95" is provided with a jacket surface 95' which is arranged in a graduated manner and is provided with two cylindrical ring surfaces 98, 98' which are distanced in the axial direction and two conical sliding surfaces 99, 99' which are situated adjacent thereto and are inwardly inclined as well as a cylindrical ring surface 98' which connects the two conical sliding surfaces 99, 99'.

Figure 20:
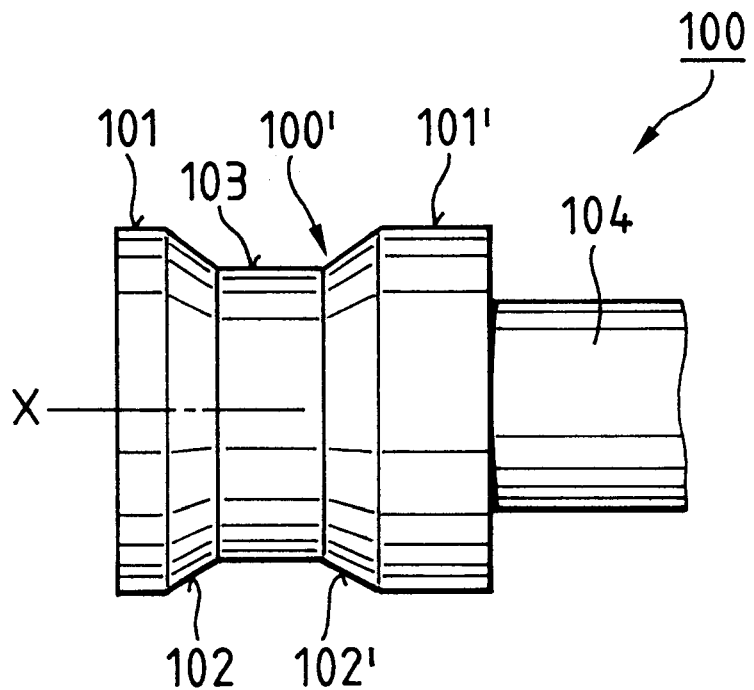
FIG. 20 shows in a projection a section of a coupling member for the apparatus pursuant to FIGS. 17 and 18 which is in engagement with the control body pursuant to FIG. 19.

In FIG. 20 the coupling element 100 with the end element 104 which is attached thereto is shown in a projection and one can recognize the outer jacket surface 100' which is arranged in a graduated manner and comprises two cylindrical ring surfaces 101, 101' which are distanced in the axial direction and are oriented parallel to the longitudinal axis X and two conical sliding surfaces 102, 102' which are situated adjacent thereto and are inwardly inclined obliquely as well as a ring surface 103 which connects the two conical sliding surfaces 102, 102'.

During the swivelling movement of the lever 82 which is arranged on the control body 95 the cylinder pins 105, 105' and 107, 107' or the balls slide along the sliding and bearing surfaces of the control body 95 and the coupling element 100 in such a way that in this process the second coupling element 100, which is operatively connected with the switch shaft 30, is displaced forcibly and depending on the direction of rotation of the control body 95 in the axial direction from the position as shown in FIG. 17 into the position as shown in FIG. 18 or vice-versa. The direction of movement of the control body 95 in the direction of arrow Z or Z' which is effected by the swivelling movement in the direction of the arrow 3" or 4" of the lever 82 occurs analogously to the movement of the control body 85 as has been explained above in connection with FIG. 12 and 13.

Notice shall be taken here that the invention is not limited to the embodiments as described above and represented in the FIGS. 1 to 20. Further embodiments are also possible without departing from the principal idea of the invention, i.e. to achieve a thrust movement of the switch shaft 30 oriented in the axial direction of the longitudinal axis and the thus operatively connected functional elements by a swivelling movement oriented about the longitudinal axis X.

What is claimed is:

1. An apparatus for actuating a switch shaft connected with a switchable bottom bracket bearing gear for a pedal drive vehicle, comprising, a hollow-cylindrical drive shaft having opposite ends;

a switch shaft coaxially supported within the drive shaft and capable of moving therewith;

a first coupling member arranged at a first end of the drive shaft so that the switch shaft and the first coupling member are jointly displaceable in an axial direction relative to the drive shaft and rotatable about a longitudinal axis of the drive shaft to connect in a form-locking manner with power-transmitting functional elements of the bottom bracket bearing gear; and a second coupling member arranged at the other end of the switch shaft; and a control body, said control body is held on the drive shaft and oriented about the longitudinal axis of said shaft, said second coupling member is operatively connected with said control body and to at least one actuating member, in such a way that, through a swiveling movement of the control body about the longitudinal axis, said control body together with the switch shaft is moved in an axial direction, and wherein through this axial movement, said first coupling member on the drive shaft can be brought into a position whereby a form locked engaging connection with the functional elements is made.

2. The apparatus as claimed in claim 1, wherein the control body has at least one guide groove at its outer circumference, oriented at an acute angle with respect to the longitudinal axis of the drive shaft and swivellable about said longitudinal axis relative to the at least one actuating member which engages in the guide groove.

3. The apparatus as claimed in claim 1, further comprising a stationary casing element having at least one adjustable pin for engagement with the at least one guide groove in said control body, and wherein said control body is located in the first actuating member which is formed as a hood, said control body brought into a form-locking engagement by at least one stop cam located on an inner side of the first actuating member to be engaged with at least one associated recess in the control body, for a joint swivelling movement about the longitudinal axis of the drive shaft with the first and second actuating member relative to said stationary casing element.

4. An apparatus as claimed in claim 3, further comprising at least one compression spring which is arranged on the inner side of the at least one actuating member, and wherein the control body is swivellable jointly therewith against a restoring force of the compression spring, relative to the casing element and about the longitudinal axis of the drive shaft.

5. An apparatus as claimed in claim 4, wherein the compression spring rests with a one end on a projection extending from a first face wall and with an other end on a shoulder extending from said projection and also on a stop arranged on the fixed casing element, said spring is brought into a pretensioned position by the swivelling movement of the first actuating member oriented relative thereto about the longitudinal axis returned to an original position by its restoring force.

6. An apparatus as claimed in claim 4, wherein the second actuating member is held with a disc-shaped flange on a shoulder of the stationary casing element, thereby occluding the hood-shaped first actuating member against outside manipulation, said second actuating member is swivellable jointly about the joint longitudinal axis with the first actuating member and the control body against the restoring force of the compression spring.

7. An apparatus as claimed in claim 1, further comprising a second actuating member that is adjacent to and connected to the first actuating member which is operatively connected with the control body, said second actuating member provided with an arc-shaped groove for securing a tension member arranged in said groove.

8. An apparatus as claimed in claim 1, wherein the control body is provided with two or more one guide grooves which are arranged mutually distributed in the circumferential direction.

9. An apparatus as claimed in claim 1, further comprising at least one driving pin through which the control body is operatively connected with a second coupling member, said driving pin penetrating the drive shaft transversally to the longitudinal axis and is guided in at least one longitudinal slot provided in the drive shaft; and also guided in an annular groove provided on the control body.

10. An apparatus as claimed in claim 9, wherein the driving pin is provided with a wedge-shaped indentation along a longitudinal dimension, and further comprising a ball to which the driving pin is operatively connected, said ball is supported by side walls of the indentation and resting in a spring-elastic manner on the switch shaft in such a way that the driving pin is arranged and guided centrally with respect to the longitudinal axis in the annular groove of the control body.

11. An apparatus as claimed in claim 1, further comprising first and second cylinder pins which are in operative connection with the control body and the second coupling member which is secured to the switch shaft, said cylinder pins are distributed in a circumferential direction and distanced in an axial direction relative to the coupling member; and wherein the control body and the second coupling member each have mutually facing sliding and control surfaces, such that moving the control body in an axial direction when swivelling the control body about the longitudinal axis, the cylinder pins cause a movement which is oriented in the axial direction of the second coupling member.

12. An apparatus as claimed in claim 11, wherein the control body has an inner jacket surface which is configured in a graduated manner and wherein the sliding surfaces of the control body are two cylindrical shaped first sliding surfaces which are distanced in the axial direction, and wherein the control surfaces comprise two control surfaces which are configured to be inwardly obliquely inclined with respect thereto and a second slide surface which mutually connects the two inclined control surfaces.

13. An apparatus as claimed in claim 12, further comprising a bracket with tension and thrust members, said bracket being in operative connection with the actuating member which is oriented about the longitudinal axis by means of the tension and thrust members and wherein the swiveling movement of the actuating member is effected through the bracket and by means of the tension and thrust members.

14. An apparatus as claimed in claim 11, wherein the first and second cylinder pins are moving in an axial direction so as to be in engagement with the sliding and control surfaces of the control body and the second coupling member, and wherein the pins are inserted in bores which are arranged in a second section of the drive shaft and oriented transversally to the longitudinal axis and oriented diametrically with respect to one another, and wherein the cylinder pins are guided within the bores relative to one another transversally to the longitudinal axis depending on the sliding and control surfaces of the second coupling member.

15. An apparatus as claimed in claim 11, wherein the first and second cylinder pins are provided with first ends facing the sliding and control surfaces of the control body and second ends the second coupling member, said first and second ends being configured with one of a rounded-off shape or a spherical shape.

16. An apparatus as claimed in claim 11, wherein at least two mutually superimposed balls are arranged in the bores between the mutually facing sliding and control surfaces of the control body and of the coupling member.

17. An apparatus as claimed in claim 11, wherein the second coupling member has an outer graduated jacket surface and two first cylindrical sliding surfaces distanced in the axial direction and two control surfaces which are inclined inwardly obliquely with respect thereto and a second sliding surface which mutually connects the two inclined control surfaces.

18. An apparatus as claimed in claim 1, further comprising an actuating member connected to the fixed casing element, said actuating member is swivellable relative to the fixed casing element about the longitudinal axis of the drive shaft and is operatively connected with the control body in such a way that during the swivelling movement of the actuating member in an inner space of the same, the coupling member and the control body are jointly displaceable with the switch shaft in the axial direction relative to the fixed casing element.

19. An apparatus as claimed in claim 18, further comprising a third actuating member, and wherein the control body is at one end operatively connected to the fixed casing element element by a first actuating member and at another end to the third actuating member by at least a second actuating member, and wherein the second actuating member is fastened to the first actuating member and has an attached section, said attached section is engaged in a recess provided on the fixed casing element element and oriented in the circumferential direction, so that the swivelling movement of the second actuating member is guided in the recess thereby limiting the swivelling movement of the actuating member.

20. An apparatus as claimed in claim 1, further comprising a lever with tension and thrust members, said lever being connected to the control body, and wherein the swiveling movement of the control body oriented about the longitudinal axis, is effected through the lever which is actuated by means of the tension and thrust members.

* * * * *